United States Patent Office 3,251,907
Patented May 17, 1966

3,251,907
METHOD FOR PREPARING TETRA-SECONDARY ALKYL METHYLENEDIPHOSPHONATES
Clarence H. Roy, Colerain Township, Hamilton County, Ohio, assignor to The Procter & Gamble Company, Cincinnati, Ohio, a corporation of Ohio
No Drawing. Filed Aug. 23, 1962, Ser. No. 218,862
6 Claims. (Cl. 260—969)

This invention relates to a method for preparing tetra-secondary alkyl methylenediphosphonates [gem-bis(dialkoxyphosphinyl)methanes]. More particularly, the present invention relates to a method for preparing tetra-secondary alkyl methylenediphosphonate esters by reacting tri-secondary alkyl phosphites with a dihalomethane; particularly, dibromomethane.

The tetra-secondary alkyl methylenediphosphonates are very versatile starting materials and valuable intermediates in the synthesis of substituted derivatives. For example, they have found extensive use as intermediates in the synthesis of tetra-substituted methylenediphosphine dioxides which are powerful extractants for uranium and other metals. In preparing these metal extractants, the tetra-secondary alkyl methylenediphosphonate is hydrolyzed to methylenediphosphonic acid; the acid is chlorinated, for instance, with phosphorus pentachloride, and the chlorinated diphosphonate is reacted with a Grignard reagent such as n-hexyl magnesium bromide to produce the desired methylenediphosphine dioxide which is then generally employed in an organic solvent, for example 1,2-dichlorobenzene. In addition, the methylenediphosphonates prepared by this invention are useful for other purposes; for example, as plasticizers. The esters prepared by this invention are also a source of methylenediphosphonic acid which is well known. Methylenediphosphonic acid salts have been disclosed as additives for shaped washing agents, U.S. Patent 2,765,279.

Heretofore, the tetra-secondary alkyl methylenediphosphonates have not been satisfactorily prepared by a direct reaction method. In general, the related normal straight chain esters of methylenediphosphonic acid have been prepared by reacting a dihalomethane, principally diiodomethane, with a tri-n-alkyl phosphite; in particular, triethyl phosphite. This method for preparing normal straight chain methylenediphosphonates has not, however, been completely satisfactory from the standpoint of the reaction rate and/or yield of the methylenediphosphonate compound nor has this method ever been successfully modified to prepare tetra-secondary alkyl methylenediphosphonates. It has been reported in the literature, for example [G. M. Kosolapoff, J. Chem. Soc., 3092, 3093 (1955)], that attempts to prepare normal straight chain methylenediphosphonates by the reaction of the dihalomethanes with triethyl phosphite give poor yields of the desired ester; namely, yields below about 30 percent. When dibromomethane is used with the triethyl phosphite, the reaction goes slowly and a particularly poor yield of the desired tetraethyl methylenediphosphonate results. Improved reaction rates and yields have been obtained when diiodomethane is used in place of the dibromomethane; however, the iodomethylphosphonate ester is formed simultaneously [J. A. Cade, J. Chem. Soc., 2266, 2268 (1959)]. It would be expected, therefore, that preparing tetra-secondary alkyl methylenediphosphonates by reacting a dihalomethane with a tri-secondary alkyl phosphite would give extremely poor yields of the desired methylenediphosphonate ester, and, on a commercial basis, require such long reaction times to produce acceptable quantities of the desired product that production of these highly useful compounds would be impractical. The need is evident for an efficient method for preparing tetra-secondary alkyl methylenediphosphonates.

Accordingly, it is an object of this invention to provide a process for the preparation of tetra-secondary alkyl methylenediphosphonates, characterized by a single reaction step, short reaction times and high yields of the desired ester product. Another object of the present invention is to provide a simple, economical and efficient method for preparing the tetra-secondary esters of methylenediphosphonic acid from easily obtainable starting materials. And still another object of this invention is to provide a process for the production of methylenediphosphonate esters from which the corresponding acids can be readily obtained at a high rate and in good yields.

It has now been found that in the reaction with tri-secondary alkyl phosphites certain dihalomethanes have outstanding utility and that the foregoing objects can be achieved by reacting a tri-secondary alkyl phosphite with such dihalomethanes; in particular, with dibromomethane.

In accordance with the preferred method of the instant invention, a tri-secondary alkyl phosphite having the general formula 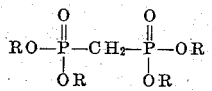 wherein R is a secondary alkyl radical, preferably a secondary alkyl radical containing three or four carbon atoms, is reacted with dibromomethane under reaction conditions given hereinbelow to yield a tetra-secondary methylenediphosphonate having the general formula $$RO-\overset{O}{\underset{OR}{P}}-CH_2-\overset{O}{\underset{OR}{P}}-OR$$

wherein R is as defined above in accordance with the following illustrative equation:

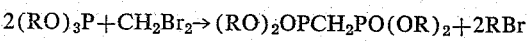

The tri-secondary alkyl phosphite starting material can be derived from a secondary alcohol and phosphorous trichloride; dibromomethane is a high temperature reaction product of methane and bromine.

Surprisingly and unexpectedly, the reaction of the present invention will only occur to the desired degree (i.e., short reaction times with high yields of the diphosphonate product) when one or preferably both of the halogen atoms in the dihalomethane is bromine and neither is chlorine. Thus, dichloromethane and chlorobromomethane are substantially unreactive and dibromomethane is particularly preferred. When diiodomethane is reacted with a tri-secondary alkyl phosphite, an alkyl iodide and a dialkyl iodomethylphosphonate are the principal products and only a small amount of the desired diphosphonate ester is obtained.

Although this invention is not to be limited by a theoretical discussion of the reaction, the high reaction rate and good yields obtained by the use of a tri-secondary alkyl phosphite and dibromomethane appear to be due to the superior reaction characteristics of the tri-secondary alkyl phosphtes which coupled with the optimum in atomic radius and reactivity found in the bromine atom allows the phosphorus to make an in-line end-on approach to the negative bromine atom at a lower energy of activation than is required when a tri-n-alkyl phosphite is reacted with a different dihalomethane. When dibromomethane is reacted with a tri-secondary alkyl phosphite, the product contains less than one mole percent of the methylene groups in the form of $BrCH_2PO_3R_2$. This indicates that the second bromine atom (i.e. in the bromomethylphosphonate) reacts with the phosphite at a speed as fast as the first bromine atom of the dibromomethane. When dibromomethane is replaced by bromochloromethane, the yield of the mono-substituted product is greatly increased and the yield of the tetra-secondary alkyl methylenediphosphonate is substantially reduced. It is clear that the bromomethylphosphonate is more reactive than the chloromethylphosphonate toward tri-secondary alkyl phosphites and that the reaction of this invention proceeds by a stepwise displacement of bromine. Since some tetra-secondary alkyl methylenediphosphonate is obtained from chlorobromomethane and none was isolated from the attempted reaction with dichloromethane, it further appears that the phosphonate grouping does not deactivate the halogen of the halomethyl intermediate. The fact that diiodomethane gives poor yields of the diphosphonate and good yields of iodomethylphosphonate indicates that steric, as well as inductive factors, may influence the course of the reaction.

The instant process produces tetra-secodary alkyl methylenediphosphonates in yields of the disitlled product of greater than about 80 percent. The principal reaction of this invention is practiced by combining a tri-secondary alkyl phosphite and dibromomethane in a suitable reaction apparatus preferably in molar ratios of from about 2:1 to about 10:1 respectively. The mixture of reactants is heated until the reaction is sufficiently complete as more fully pointed out and described hereinafter. If desired, the methylenediphosphonate ester is converted to diphosphonic acid by treatment with mineral acid as well-known in the art and hereinafter illustrated in Example I, parts B and C. It has been found that an improved yield of the free diphosphonic acid is obtained when the ester prepared by the principal process of this invention is not purified and the principal reaction of this invention is carried out directly to the acid.

In carrying out the present process of forming tetra-secondary methylenediphosphonates, it is preferred to employ reaction temperatures between about 130° C. and about 200° C. The initial temperature is primarily a function of the molar ratio of the reactants; the more phosphite present, the higher the initial boiling temperature of the reaction mixture. As the reaction proceeds, the speed of the reaction gradually increases with a corresponding increase in the reaction temperature. It is preferred to maintain the reaction at a temperature between 170° C. and 185° C. by reducing the external heat applied to the reaction when this optimum reaction temperature range has been achieved.

Special precautions and conditions preferably are employed in the instant process to retain the dibromomethane in the reaction system and to insure temperatures which are sufficiently high to initiate and maintain a reasonable reaction rate. These conditions can be achieved by employing at least about a 50 percent molar excess of the phosphite (3:1 molar ratio of phosphite to dibromomethane) and by (a) using a recycling procedure to retain all the volatile material (the dibromomethane and the secondary alkyl bromide by-product) in the reaction vessel during the early stages of the reaction, or (b) by fractionating the volatiles and taking off the secondary alkyl bromide by-product and recycling the dibromomethane.

One of the principal advantages of the present process is the formation of the unreactive secondary alkyl bromide by-product which thereby eliminates the formation of spurious alkylphosphonates along with the desired methylenediphosphonate ester. These spurious products would, of course, decrease the amount of the desired methylenediphosphonate which is produced. The formation of such undesirable alkyl phosphonate by-products is one of the principal disadvantages of the conventional reaction of dihalomethane with the tri-n-alkyl phosphites. Since the secondary alkyl bromide formed by the present process is unreactive in the instant reaction system, it does not necessarily need to be removed. In some instances, however, it may be desirable to separate this by-product as indicated above and weight it in order to follow the progress of the reaction. The time of the reaction, which is about 6 to 22 hours depending upon the conditions used, is determined by the length of time required for the theoretical amount of the unreactive bromide by-product to be collected.

The yields from the instant reaction are substantially reduced if less than stoichiometric amounts of the phosphite are used (2 moles of the tri-secondary alkyl phosphite to 1 mole of the dibromomethane). Greatly improved yields are obtained when excesses, for example, 50 percent molar excesses, of the phosphite are employed (3 moles of the phosphite to 1 mole of the dibromomethane). Therefore, it is preferred in all instances to heat from about 2 moles to about 10 moles of the phosphite with about 1 mole of dibromomethane.

The process of the invention will be illustrated by the following specific embodiments. There are, of course, modifications of these embodiments which can be made by those skilled in the art without departing from the scope of this invention as defined in the appended claims.

*Example I*

(A) Triisopropyl phosphite (3 moles, 624.7 gm.) and dibromomethane (1 mole, 173.9 gm.) were combined in a reaction apparatus composed of a 1-liter, 3-neck flask fitted with a magnetic stirrer, a thermometer, and a 24-inch fractionating column for separating the isopropyl bromide by-product from the refluxing mixture. The fractionating column was constructed from a Liebig condenser that had been modified to accommodate ¼-inch glass helices as packing. The temperature of the water circulating through the column jacket (Liebig condenser) was maintained at 65° C. during the entire reaction period. This temperature was sufficient to retain unreacted starting material in the reaction system and allow the isopropyl bromide to be distilled. A Barrett distilling receiver, which had been modified by the addition of a thermometer well and thermometer, was connected to the top of the fractionating column; and to the top of the Barrett receiver was fitted a Dewar condenser cooled with Dry Ice and protected from atmospheric moisture by a drying tube. Heat was applied to the reaction flask containing the triisopropyl phosphite and dibromomethane reactants until the reaction commenced (140° C.), and then continued for an additional 7 hours, over which time the temperature of the mixture was gradually raised until a maximum temperature of 185° C. was reached. The temperature was held constant at 185° C. for the remaining reaction time (2 hours) by means of an electronic temperature controller.

After the excess isopropyl phosphite had been removed from the reaction mixture through a still under a vacuum of 0.1 mm. of mercury and head temperatures up to 50° C., the remaining product was further distilled in a vacuum jacketed, one-piece still at temperatures between 86° C. and 113° C., under a vacuum of from 4 to 25 microns (0.004 to 0.025 mm. of mercury). A yield of 92.6%, 319.3 gm., of tetraisopropyl methylenediphosphonate was thus obtained, $n_D^{25}$ 1.4316. The product was essentially pure and required no further refinement before use as a chemical intermediate. For analytical purposes a sample of of the once distilled material was fractionated twice: B.$_{0.003}$ 87–90° C., B.$_{0.1}$ 114° C., $n_D^{25}$ 1.4316, $d_4^{25}$ 1.0531. Calculated for $C_{13}H_{30}P_2O_6$: C, 45.35; H, 8.78, P, 17.99. Found: C, 45.12; H, 8.84, P, 17.93.

(B) A 20 gm. (0.058 mole) sample of the tetraisopropyl methylenediphosphonate prepared in Example I by removing the excess isopropyl phosphite from the reaction mixture but without further distillation of the tetraisopropyl methylenediphosphonate was dissolved in 100 ml. of concentrated hydrochloric acid and the mixture was refluxed for 3 hours to effect hydrolysis of the diphosphonate. The solution was then transferred to a flash evaporator and reduced to a constant volume under vacuum. The last traces of water and hydrochloric acid were removed by adding three portions of isopropyl alcohol and reducing the volume after each addition. The white crystalline mass which remained (M.P. 195°–200°) was filtered and washed with isopropyl alcohol and acetone and dried in a vacuum desiccator over potassium hydroxide. The yield of dried methylenediphosphonic acid M.P. 203°–206° C., was 9.88 gm., 97% of theory. Calculated for $CH_6O_6P_2$: C, 6.82, H, 3.44; P, 35.20. Found: C, 7.15; H, 3.20; P, 35.65.

(C) When a similar 20 gm. sample of tetraisopropyl methylenediphosphonate was hydrolyzed with concentrated hydrobromic acid in the manner analogous to that described above, a 96% yield of dried methylenediphosphonate acid was obtained. The diphosphonic acid crystals were characterized by their light brown color.

The methylenediphosphonic acid derived from the tetraisopropyl methylenediphosphonate prepared in accordance with the procedure of Example I, part A, by either of the hydrolysis procedures of parts B and C is highly useful in the synthesis of tetra-substituted methylenediphosphine dioxides.

*Example II*

A mixture of 71.7 gm. (0.286 mole) of trisecondary butyl phosphite and 16.6 gm. (0.0955 mole) of dibromomethane was refluxed in the reaction apparatus described in Example I, part A. The initial reflux temperature was 155° C.; and as the reaction progressed, the temperature was increased to 180° C. Since the boiling points of the dibromomethane starting material and of the secondary-butyl bromide by-product are close (98.2° C. and 91.3° C. respectively), the temperature of the circulating water in the column jacket was held at 92° C. In addition the distillate was, from time to time, slowly returned to the reaction vessel during the early stages of the reaction to insure complete reaction of any dibromomethane which might have co-distilled with the secondary-butyl bromide. After heating for 10 hours, the reaction was complete and the low boiling materials were stripped from the system with a moderate vacuum.

The high boiling liquid which remained was distilled through a one-piece, short, vacuum jacketed column. Two lower boiling cuts were obtained; the first amounted to 25.2 gm. and was collected in the range of 35° to 44° C. at 30 microns ($n_D^{25}$ 1.4240), and the second was 2.1 gm. which boiled in the range of 35 to 75° C. at 27 michons ($n_D^{25}$ 1.4301). The third cut, 31.2 gm. was pure tetra-secondary-butyl methylenediphosphonate and was collected in the range of 100–102° C. at 20 microns. The yield of pure material thus obtained was 81.7%.

Calculated for $C_{17}H_{38}P_2O_6$: C, 50.99; H, 9.57; P, 15.47. Found: C, 49.5; H, 9.4; P, 14.3.

As may be seen by reference to the foregoing examples, tetra-secondary alkyl methylenediphosphonates can be obtained in exceedingly high yields with comparatively short reaction times when a tri-secondary alkyl phosphite is reacted with dibromomethane. Moreover, exceedingly high yields of methylenediphosphonic acid can be obtained by hydrolyzing the diphosphonate esters. The critical feature of this invention is the selection of the principal reactants, the tri-secondary alkyl phosphite and the dibromomethane, to give the desirable results obtained: namely, an efficient method for the preparation of tetra-secondary alkyl methylenediphosphonates.

Although the process of this invention has been exemplified as a batchwise process, the process can be carried out in a continuous manner. For example, the trisecondary alkyl phosphite and dibromomethane can be introduced continuously into a reaction zone at the desired reaction temperature while methylenediphosphonate can be continuously removed from the reactor. If desired, the secondary alkyl bromide by-product can be continuously removed by fractionating the volatiles, removing this by-product therefrom, and recycling the dibromomethane.

What is claimed is:

1. A method for preparing a methylenediphosphonate compound having the formula

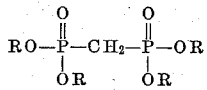

where R is a secondary alkyl having from 3 to 4 carbon atoms which comprises reatcing from about 2 moles to about 10 moles of a phosphite compound having the formula $(RO)_3P$ where R is as above with about 1 mole of dibromomethane.

2. A method for preparing a methylenediphosphonate compound having the formula

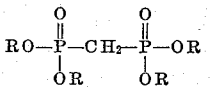

where R is a secondary alkyl having from 3 to 4 carbon atoms which comprises heating at a temperature between about 130° C. and about 200° C. from about 2 moles to about 10 moles of a phosphite compound having the formula $(RO)_3P$ where R is as above with about 1 mole of dibromomethane and separating the secondary aklyl halide formed from the resultant methylenediphosphonate compound.

3. A method for preparaing tetraisopropyl methylenediphosphonate which comprises reacting from about 2 moles to about 10 moles of triisopropyl phosphite with about 1 mole of dibromomethane.

4. A method for preparing tetraisopropyl methylenediphosphonate which comprises heating at a temperature between about 130° C. and about 200° C. from about 2 moles to about 10 moles of triisopropyl phosphite with about 1 mole of dibromomethane and separating the isopropyl bromide formed from the resultant tetraisopropyl diphosphonate.

5. A method for preparing tetra-secondary butyl methylenediphosphonate which comprises reacting from about 2 moles to about 10 moles of trisecondary-butyl phosphite with about 1 mole of dibromomethane.

6. A method for preparing tetra-secondary butyl methylenediphosphonate which comprises heating at a temperature between 130° C. and 200° C. from about 2 moles to about 10 moles of trisecondary-butyl phosphite with about 1 mole of dibromomethane and separating the secondary-butyl bromide formed from the resultant tetrasecondary butyl methylenediphosphonate.

References Cited by the Examiner

UNITED STATES PATENTS 2,599,761  6/1952  Harman et al. _____ 260—461 X
2,957,904  10/1960  Stiles _____ 260—461

OTHER REFERENCES

Ford-Moore et al.; "J. Chem. Soc." (1947), pp. 1465–1467.

Pudovik et al.: "Bull. Acad. Sci. U.S.S.R. Div. Chem. Sci.," 1952, pages 813–817.

CHARLES B. PARKER, *Primary Examiner.*

MORRIS LIEBMAN, IRVING MARCUS, *Examiners.*